US011459933B2

(12) United States Patent
Larson et al.

(10) Patent No.: US 11,459,933 B2
(45) Date of Patent: Oct. 4, 2022

(54) ACCESSIBLE CLUTCH ATTACHMENT ASSEMBLY AND METHOD

(71) Applicant: Horton, Inc., Roseville, MN (US)

(72) Inventors: Benjamin Larson, Woodbury, MN (US); David R. Hennessy, Burnsville, MN (US); Mathew Stahl, Maple Grove, MN (US); Kristen Spurlock, Minneapolis, MN (US)

(73) Assignee: HORTON, INC., Roseville, MN (US)

( * ) Notice: Subject to any disclaimer, the term of this patent is extended or adjusted under 35 U.S.C. 154(b) by 0 days.

(21) Appl. No.: 17/447,624

(22) Filed: Sep. 14, 2021

(65) Prior Publication Data

US 2022/0099015 A1   Mar. 31, 2022

Related U.S. Application Data

(60) Provisional application No. 63/084,132, filed on Sep. 28, 2020.

(51) Int. Cl.
  *F01P 7/08*   (2006.01)
  *F16D 13/58*   (2006.01)
  (Continued)

(52) U.S. Cl.
  CPC .............. *F01P 7/085* (2013.01); *F01P 5/04* (2013.01); *F16D 13/58* (2013.01);
  (Continued)

(58) Field of Classification Search
  None
  See application file for complete search history.

(56) References Cited

U.S. PATENT DOCUMENTS 3,444,748 A   5/1969 Sutaruk
3,661,237 A   5/1972 Thompson
(Continued)

FOREIGN PATENT DOCUMENTS

CN   207499965 U   6/2018
DE   4213203 C1   9/1993
(Continued)

OTHER PUBLICATIONS

Horton Holding, Inc., "DM Advantage® On/Off, Two-Speed and Reman Fan Drives" Brochure, Form #22896-N-0119 E (2019), 2 pages.
(Continued)

*Primary Examiner* — Timothy Hannon
(74) *Attorney, Agent, or Firm* — Westman, Champlin & Koehler, P.A.

(57) ABSTRACT

A clutch assembly includes a journal bracket having a center shaft, a drive feature rotatably supported on the center shaft of the journal bracket and configured to accept a torque input to the clutch assembly, a clutch pack that is controllable to selectively transmit torque between an input and an output, a housing attached to the clutch pack that includes a stub shaft, a removable connection engaged between the drive feature and the stub shaft such that torque is transmittable through the removable connection during operation of the clutch assembly, and one or more perpendicular engagement features on the stub shaft configured to accept a tool to engage and disengage the removable connection. At least one of the perpendicular engagement features is exposed to line-of-sight access from a location substantially perpendicular to an axis of rotation of the clutch pack.

20 Claims, 3 Drawing Sheets

(51) Int. Cl.
*F01P 5/04* (2006.01)
*F16D 25/0635* (2006.01)

(52) U.S. Cl.
CPC ...... *F16D 25/0635* (2013.01); *F16D 2300/08* (2013.01); *F16D 2300/12* (2013.01)

(56) References Cited

U.S. PATENT DOCUMENTS

| | | | |
|---|---|---|---|
| 3,824,807 | A | 7/1974 | Hecht |
| 4,068,907 | A | 1/1978 | Zenthoefer |
| 4,073,370 | A | 2/1978 | Tinholt |
| 4,074,662 | A | 2/1978 | Estes |
| 4,320,723 | A | 3/1982 | Wendling et al. |
| 4,355,710 | A | 10/1982 | Schilling |
| 4,402,678 | A | 9/1983 | St. John |
| 4,544,054 | A | 10/1985 | Brown |
| 4,579,206 | A | 4/1986 | Velderman et al. |
| 4,824,422 | A | 4/1989 | Jocic |
| 4,838,841 | A | 6/1989 | Harvey |
| 5,163,883 | A | 11/1992 | Bradfield |
| 5,408,897 | A | 4/1995 | Klinar |
| 5,627,422 | A | 5/1997 | Boggs, III et al. |
| 6,071,206 | A | 6/2000 | Monahan et al. |
| 6,092,638 | A | 7/2000 | Vatsaas |
| 6,109,871 | A | 8/2000 | Nelson et al. |
| 6,129,193 | A | 10/2000 | Link |
| 6,293,885 | B1 | 9/2001 | Serkh et al. |
| 6,838,796 | B1 | 1/2005 | Nelson |
| 7,041,020 | B2 | 5/2006 | Singer |
| 7,047,911 | B2 | 5/2006 | Robb et al. |
| 7,108,623 | B2 | 9/2006 | Cadarette et al. |
| 7,913,826 | B2 | 3/2011 | Boyer |
| 8,881,888 | B2 | 11/2014 | Overley et al. |
| 8,887,888 | B2 | 11/2014 | Hennessy et al. |
| 9,062,759 | B2 | 6/2015 | Arnault et al. |
| 9,074,626 | B2 | 7/2015 | Takahashi et al. |
| 9,086,102 | B2 | 7/2015 | Swanson et al. |
| 9,810,308 | B2 | 11/2017 | Quincay et al. |
| 9,863,520 | B2 | 1/2018 | Tembreull et al. |
| 10,385,932 | B2 | 8/2019 | Krammer et al. |
| 2010/0234157 | A1 | 9/2010 | Kikukawa et al. |
| 2013/0133198 | A1* | 5/2013 | Oachs ............... B25B 13/48 29/888.025 |
| 2015/0125103 | A1 | 5/2015 | Ciulla et al. |

FOREIGN PATENT DOCUMENTS

| | | |
|---|---|---|
| EP | 1404989 B1 | 11/2007 |
| WO | 2000/024112 A1 | 4/2000 |
| WO | 2007/109278 A1 | 9/2007 |
| WO | 2010/056830 A2 | 5/2010 |
| WO | 2014/159374 A1 | 10/2014 |
| WO | 2016/187016 A2 | 11/2016 |
| WO | 2018/004833 A1 | 1/2018 |
| WO | 2021/151110 A1 | 7/2021 |

OTHER PUBLICATIONS

Horton Holding, Inc., "DM Advantage® and HT/S Advantage® Reman Fan Drives" Brochure, Form #23112-B-1018 E (2018), 2 pages.

* cited by examiner

ACCESSIBLE CLUTCH ATTACHMENT ASSEMBLY AND METHOD

CROSS-REFERENCE TO RELATED APPLICATION(S)

The present application is based on and claims the benefit of U.S. provisional patent application Ser. No. 63/084,132, filed Sep. 28, 2020, the content of which is hereby incorporated by reference in its entirety.

FIELD

The present invention relates generally to clutch assemblies and associated methods, and more particularly to fan clutch assemblies and associated methods.

BACKGROUND

Current fan clutch designs, particularly on/off dry friction fan clutches, utilize a single piece pulley/housing called a sheave. The sheave is typically made from relatively heavy materials such as cast iron. The sheave is used to transmit torque from a drive belt to a clutch pack, which can selectively transmit a torque output as a function of a torque input from the drive belt. In a typical cooling system installation, the sheave, clutch pack, and a fan are mounted within an engine compartment, often with a journal bracket that supports the sheave, clutch pack, and fan on an engine block. In order to complete maintenance on such a fan clutch, the journal bracket and sheave are left attached to the engine block and the clutch pack is removed and, following desired maintenance, replaced.

However, prior art fan clutch assemblies present issues associated with removing and/or replacing the fan clutch in vehicular applications (for example, within an engine compartment of a truck). Previous fan clutches are designed in a way that makes removal of the clutch pack difficult while in the vehicle due to the use of attachment bolts that run parallel to an axis of rotation of the clutch pack. A hood of a truck typically opens towards the front, which makes the clutch pack accessible from the side only (that is, perpendicular to the axis of rotation). Bolts orientated parallel to the axis of rotation are difficult to access and not readily visible for the mechanic, increasing maintenance time. Such bolts are especially difficult to access due to their positions, typically at or near a rear of the clutch assembly behind an input belt and obstructed by various components of the clutch assembly and/or the fan. Examples of known fan clutch assemblies with such difficult-to-access parallel-oriented attachment bolts are disclosed in PCT International Application Pub. No. WO/2010/056830A2, U.S. Pat. Nos. 9,086,102, 6,838,796, 6,109,871, and 6,092,638, for example. In such prior art clutches, the sheave is typically configured as a single piece that forms a portion of a piston chamber boundary. In other prior art clutches, a center bolt located at the axis of rotation is used to attach the clutch pack to a bracket, pulley, or the like, but such center bolts are also parallel-oriented and present the same or similar access problems.

Disclosed embodiments of the present invention provide a clutch assembly and associated method that allows a mechanic to disassemble or dismount the clutch pack from the side instead of needing to access attachment bolts at the front of the clutch assembly. Moreover, embodiments of the present invention allow for improved replacement and/or repair of rotary fluid union sealing elements for fluid-actuated clutches, which can be provided in combination with side-access features of a fan clutch assembly.

SUMMARY

In one aspect of the present disclosure, a clutch assembly includes a journal bracket having a center shaft, a drive feature rotatably supported on the center shaft of the journal bracket that is configured to accept a torque input to the clutch assembly, a clutch pack that is controllable to selectively transmit torque between an input and an output, a housing attached to the clutch pack with the housing including a stub shaft, a removable connection engaged between the drive feature and the stub shaft such that torque is transmittable through the removable connection during operation of the clutch assembly, and one or more perpendicular engagement features on the stub shaft configured to accept a tool to engage and disengage the removable connection. At least one of the perpendicular engagement features is exposed to line-of-sight access from a location substantially perpendicular to an axis of rotation of the clutch pack.

In another aspect, an assembly includes an engine compartment enclosure at least partially surrounding an engine compartment, an engine positioned at least partially within the engine compartment enclosure, a clutch assembly mounted on or near the engine that accepts torque input from the engine, and a fan. The clutch assembly includes a journal bracket having a center shaft, a drive feature (a pulley, a sprocket, or a gear) rotatably supported on the center shaft of the journal bracket, a clutch pack that is controllable to selectively transmit at least a portion of the torque input received by the clutch assembly during operation between an input and an output, a stub shaft attached to the clutch pack, a removable connection engaged between the drive feature and the stub shaft such that torque is transmittable through the removable connection during operation of the clutch assembly, a face seal carried by the journal bracket, a floating seal carried within the stub shaft, and a perpendicular engagement feature (a slot for a pin spanner wrench or a wrench flat) on the stub shaft configured to accept a tool to engage and disengage the removable connection. The perpendicular engagement feature is exposed to line-of-sight access from a location substantially perpendicular to an axis of rotation of the clutch pack. The fan is carried by the clutch pack.

In yet another aspect, a method for performing maintenance or repair on a fan clutch assembly that selectively transmits torque to a fan and is mounted within an engine compartment includes engaging a tool with one or more perpendicular access features on the fan clutch assembly from a location (L) with substantially perpendicular line-of-sight access from outside the engine compartment, disconnecting a common unit that includes a stub shaft and a clutch pack from a drive feature (a pulley, a sprocket, or a gear) that accepts a torque input to the fan clutch assembly to disengage a removable connection using the tool, performing a repair or replacement operation on at least one component of the fan clutch assembly while the common unit is disconnected from the drive feature and the removable connection is disengaged, and re-connecting the common unit to the drive feature to re-engage the removable connection after performing the repair or replacement operation. The location (L) extends through an axial gap that adjoins the stub shaft between the drive feature and the clutch pack. A journal bracket of the fan clutch assembly remains secured to a mounting location within the engine compartment when the common unit is disconnected from the drive feature.

The present summary is provided only by way of example, and not limitation. Other aspects of the present invention will be appreciated in view of the entirety of the present disclosure, including the entire text, claims, and accompanying figures.

Figure 1:
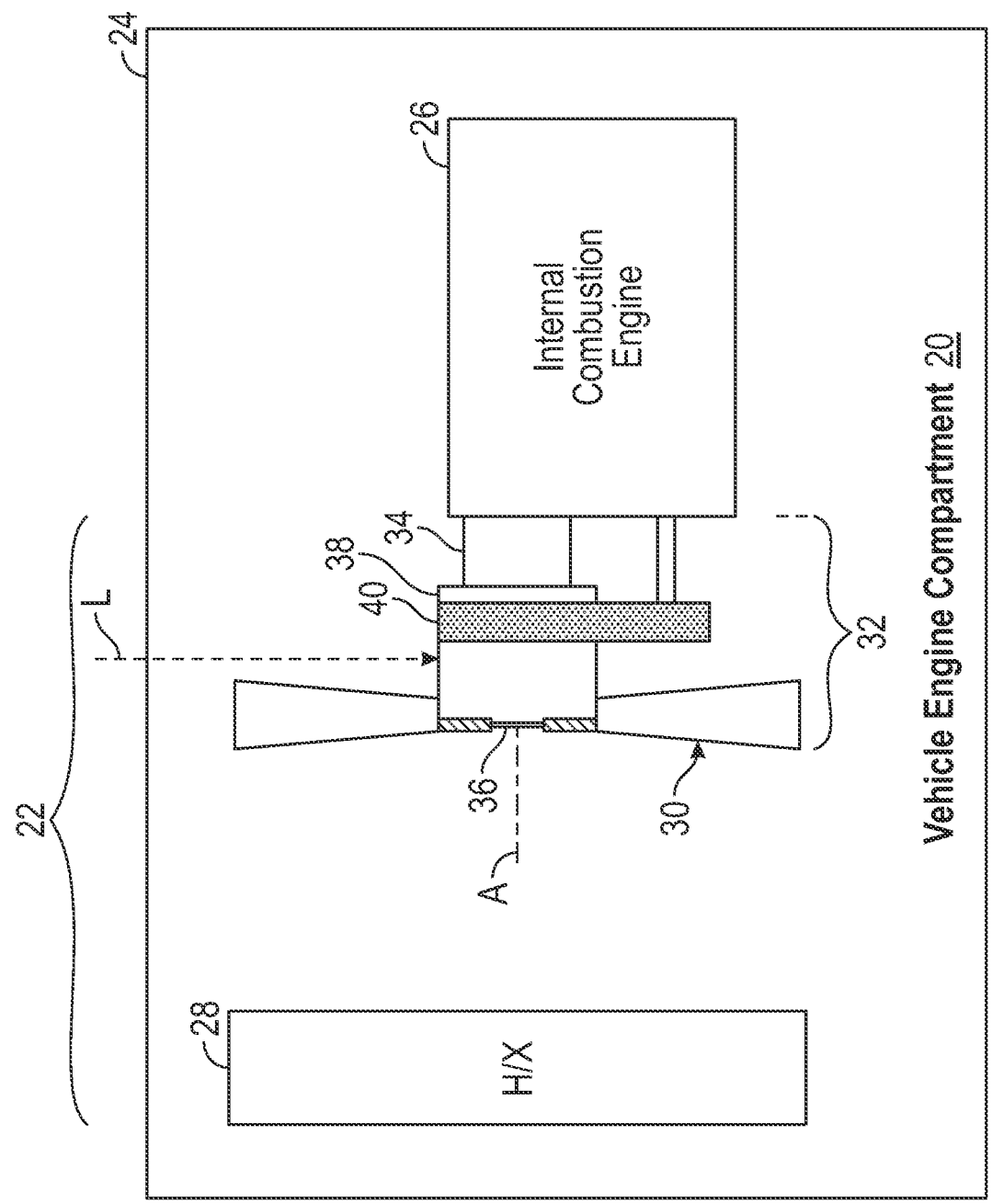
FIG. 1 is a schematic depiction of an embodiment of a vehicle engine compartment with a cooling system.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

A clutch assembly is disclosed that is suitable for gear-, sprocket-, or pulley-driven process applications, including vehicle cooling systems with fan clutches used to selectively rotate a cooling fan. An input to the clutch is a drive feature such as a gear, sprocket, pulley (or sheave), or the like. An output from the clutch is a selective coupling that can transmit torque to a secondary device (such as a fan). The drive feature can be mounted on a journal bracket, which can be stationary, that is, rotationally fixed relative to a given mounting location. In general, the disclosed clutch assembly includes a drive feature (e.g., pulley) which is removably connected to a housing that transmits torque to a clutch pack, with the pulley and the housing connected in such a way that a mechanic will only need access to the clutch assembly perpendicular to (or substantially perpendicular to) an axis of rotation of the clutch pack to disassemble the housing (and the clutch pack) from the pulley. In various embodiments, the removable connection could be a threaded, bayonet-style, bolted, or other suitable mechanical connection. The clutch pack and housing can be removed from the pulley portion of the clutch assembly while the pulley portion of the clutch assembly is still attached to the journal bracket and an associated mounting location (e.g., still attached to an engine). This mounting arrangement has many distinct advantages. One, the clutch pack and housing can be removed from a vehicle with improved efficiency because access to the bolts parallel to the axis of rotation is not needed. Two, differing materials (e.g., aluminum and cast iron) can be utilized for certain clutch assembly components to help reduce or minimize the mass of the clutch, and thus helping to improve the ergonomics of removing, installing, and maintaining a fan clutch. Three, the overall mass of the clutch assembly is reduced or minimized, which in turn helps to reduce an overall weight of a vehicle in which the clutch assembly is installed. Further, the disclosed apparatus and method can provide a rotary fluid union that facilitates maintenance and/or replacement of components subject to wear. These and other features and benefits will be recognized by persons of ordinary skill in the art in view of the entirety of the present disclosure, including the accompanying drawings.

FIG. 1 is a schematic depiction of an embodiment of a vehicle engine compartment 20 with a cooling system 22. The vehicle has an engine compartment enclosure 24 within which is positioned an internal combustion engine 26. The cooling system 22 for the engine 26 includes a heat exchanger (H/X) 28 such as a radiator, a cooling fan 30, and a fan clutch assembly 32. The fan clutch assembly 32 includes a journal bracket 34 mounted to an engine block of the internal combustion engine 26, as well as a clutch pack 36 and pulley 38 both supported on the journal bracket 34. A belt 40 delivers torque from the engine 26 to the pulley 38, which in turn delivers an input torque to the clutch pack 36. The cooling fan 30 is attached to the clutch pack 36, which can selectively control rotation of the cooling fan 30, such that the cooling fan 30 can be selectively rotated at a different speed than the pulley 38 including turning off the cooling fan 30. It should be noted that the depiction in FIG. 1 is a highly simplified schematic representation, meaning that in actual embodiments certain components may have different shapes than those illustrated only schematically and various components are not specifically shown or labelled in that drawing.

Figure 2:
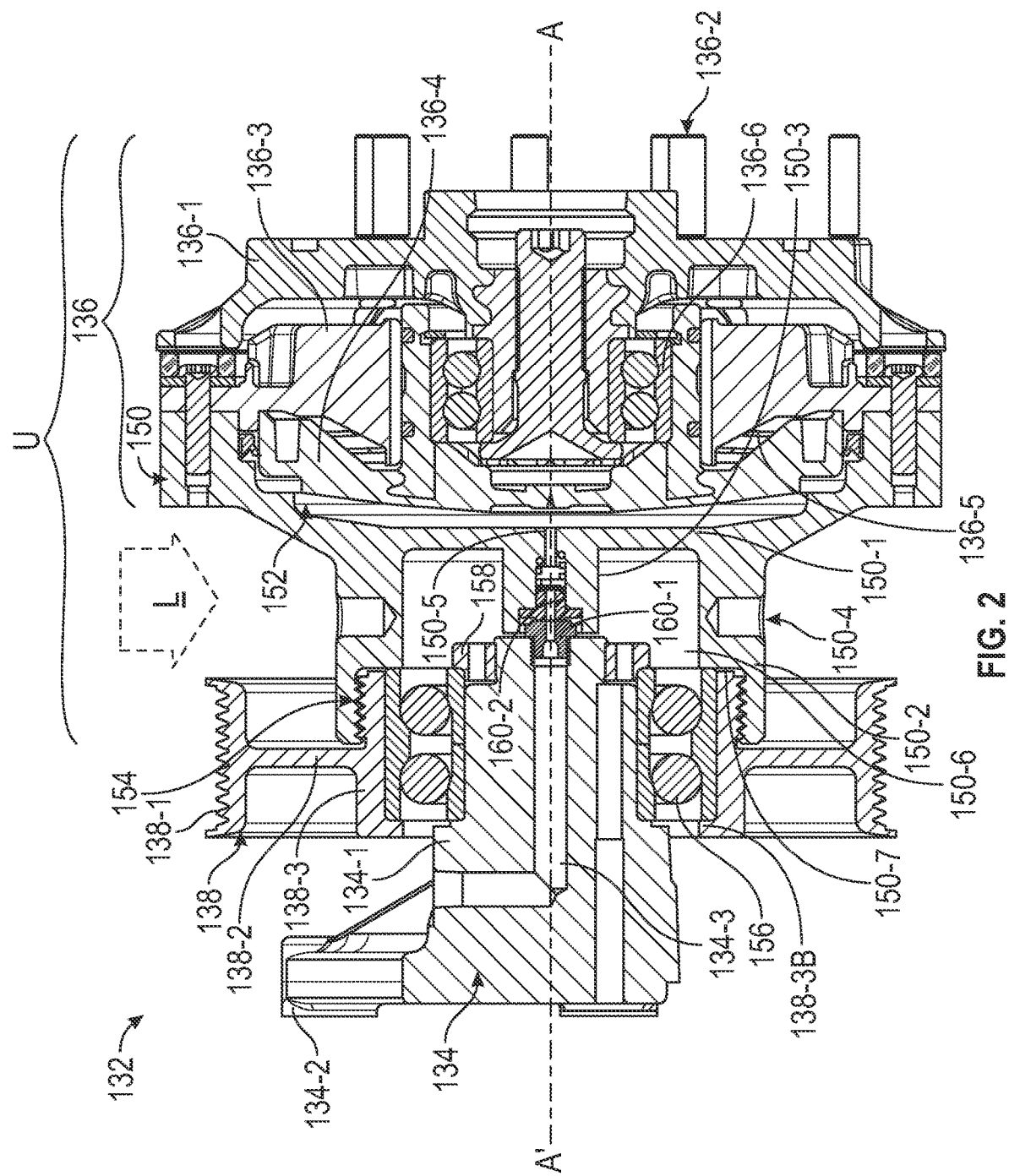
FIG. 2 is a cross-sectional view of an embodiment of a clutch assembly.
Figure 3:
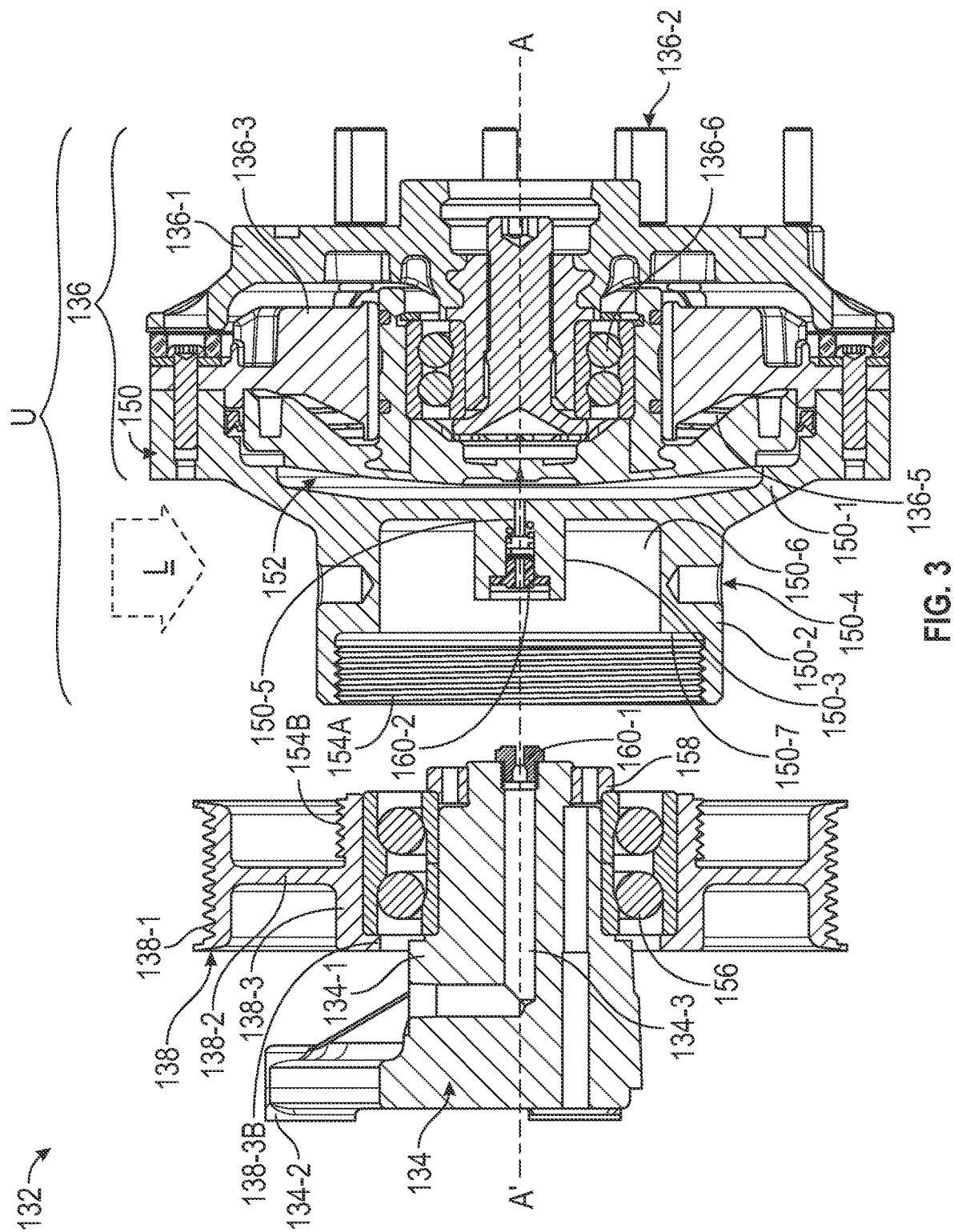
FIG. 3 is a cross-sectional view of the clutch assembly of FIG. 2 in a partly disassembled or uninstalled state.

FIG. 2 is a cross-sectional view of an embodiment of a clutch assembly 132, shown in an installed state, and FIG. 3 is a cross-sectional view of the clutch assembly 132 in a partly disassembled or uninstalled state. As shown in FIGS. 2 and 3, the clutch assembly 132 includes a journal bracket 134, a clutch pack 136, a drive feature 138, a housing 150, and a rotary fluid union. An axis of rotation A is defined by the clutch pack 136, and which aligns with an axis of rotation A' defined by the drive feature 138.

The journal bracket 134 can include a center shaft 134-1 and mounting flange 134-2, as well as a passageway 134-3 extending through at least part of the center shaft 134-1. The journal bracket 134 is rotationally fixed to a mounting location, such as through an attachment to an engine block with suitable fasteners (e.g., bolts) connected to the mounting flange 134-2. The journal bracket 134 can be made of cast iron. A fluid (e.g., pneumatic) supply line (not shown) can be connected to the passageway 134-3 in the journal bracket 134. While some fan clutches use a "live" shaft configuration, use of a stationary journal bracket instead is desirable for some applications, even though the use of a journal bracket presents design challenges that are not present with live shaft clutch assemblies.

The clutch pack 136 can be configured like a DM Advantage® dry friction fan clutch pack available from Horton, Inc. (Roseville, Minn., USA) or the same or similar to dry friction fan clutch packs disclosed in U.S. Pat. No. 6,838, 796 or 6,092,638. In the illustrated embodiment, the clutch pack 136 is a single-speed, on/off dry friction clutch pack. A fan mounted friction disk (FMFD) 136-1 is a component of the illustrated clutch pack 136 to which a fan (not shown in FIGS. 2 and 3 but see FIG. 1) can be attached with threaded studs 136-2 or other suitable attachment mechanism(s). The FMFD 136-1 can function as an output of the clutch pack 136. Other components of the clutch pack 136 can include a reaction plate 136-3, a piston 136-4, one or more springs 136-5 engaged between the reaction plate 136-3 and the piston 136-4, and bearings 136-6. The reaction plate 136-3 functions as an input of the clutch pack 136 that, along with the housing 150 and the drive feature 138, accepts a torque input from a motor or engine and that generally rotates at all time whenever there is a torque input to the clutch assembly 132. The bearings 136-6 allow the FMFD 136-1 to rotate relative to the reaction plate 136-3, as well as relative to the piston 136-4 and certain other components, particularly when the clutch pack 136 is frictionally disengaged. During operation of the clutch assembly 132, the FMFD 136-1 and any attached fan are selectively rotated as a function of the operational state of the clutch pack 136, with FMFD 136-1 and fan rotating when the clutch pack 136 is in a frictionally engaged state. The clutch pack 136 can be frictionally spring-engaged by default and frictionally disengaged when a fluid signal actuates the piston 136-4 against the spring biasing force. Two-speed friction clutches with an eddy current drive providing a second operational speed when the clutch is frictionally disengaged are also known and can be utilized with alternative embodiments of the present invention.

The housing 150 is attached to the clutch pack 136 with fasteners and can form a portion of a boundary of a piston chamber 152. In that way, the clutch pack 136 and the housing 150 are connected together as a common unit U that includes the piston chamber 152. The housing 150, as well as the drive feature 138, function as part of the input of the clutch assembly 132, and therefore the housing 150 is connected to an input of the clutch pack 136. When the clutch assembly 132 is in use, selective pressurization of the piston chamber 152 can control the operation of the clutch pack 136, such as by axially translating the piston 136-4 as well as the FMFD 136-1 and the bearings 136-6. In some prior art clutch assemblies, a separate cap member or the like on either the clutch pack or the journal bracket was required to form part of a piston chamber boundary and/or to hold part of the rotary fluid union; however, the configuration of the housing 136, which is described further below, can avoid the need for such an additional cap member. The housing 150 can be made of aluminum, for example.

As shown in the illustrated embodiment, the housing 150 includes a body 150-1, a rearwardly-extending, axially-oriented stub shaft 150-2 that is threaded (e.g., with internal threads 154A), a central boss 150-3, and one or more perpendicular engagement features 150-4 that permit disassembly of the housing 150 from the drive feature 138 (and the journal bracket 134) from a location L perpendicular or substantially perpendicular to the axes of rotation A and A'. While the housing 150 in the illustrated embodiment is a single monolithic component, the housing 150 could be made up of an assembly of separate components connected together in a suitable manner in alternative embodiments. The body 150-1 can provide a generally radially-extending web of material that forms a portion of a boundary of the piston chamber 152. The stub shaft 150-2 extends from the body 150-1. The central boss 150-3 can also extend rearwardly from the body 150-1. A passage 150-5 aligned with the axis of rotation A passes through the body 150-1 and the central boss 150-3, which allows a fluid signal to be sent to the piston chamber 152 to control operation of the clutch assembly 132. The perpendicular engagement feature(s) 150-4 can be located axially forward of the drive feature 134 and a removable connection 154 (discussed further below). In the illustrated embodiment, the perpendicular engagement features 150-4 are a plurality of generally radial slots or notches on an outer surface of the stub shaft 150-2 that can be engaged with a pin spanner wrench or the like and are visible with a direct line of sight from the location L perpendicular to the axis of rotation (shown schematically by a dashed arrow in the figures). The location L allowing perpendicular or substantially perpendicular access is at an axial gap that adjoins the stub shaft 150-2 and is between the body 150-1 of the housing 150 (and the clutch pack 136) and both a rear end of the stub shaft 150-2 and the drive feature 138 (when the removable connection 154 is engaged). Moreover, as shown in the illustrated embodiment, the perpendicular engagement features 150-4 are located axially forward of the center shaft 134-1 of the journal bracket 134 and are spaced radially outward from the axis of rotation A. In the illustrated embodiment, the perpendicular engagement features 150-4 also have exposed faces for tool engagement at locations radially outward relative to bearings 156 and the removable connection 154. In alternative embodiments, the perpendicular engagement features 150-4 can be wrench flats or other engagement features accessible (and visible) from the location L perpendicular or substantially perpendicular to at least the axis of rotation A. The stub shaft 150-2 of the housing 150 can have pockets or a hollow portion to help reduce mass of the clutch assembly or offset a mass penalty (if any) associated with axial lengthening (if any) of the clutch assembly 132 that results from the removable connection 154. In the illustrated embodiment, a pocket 150-6 is provided in the stub shaft 150-2 surrounding the central boss 150-3. Additionally, in the illustrated embodiment, a shoulder 150-7 is provided at or near a rear end of the stub shaft 150-2, which is explained further below.

The drive feature 138 in the illustrated embodiment is a pulley or sheave, but could be a gear, sprocket, or the like in alternative embodiments. The drive feature 138 is removably connected to the housing 150 via the removable connection 154, and input torque to the clutch assembly 132 can be transmitted through the removable connection 154 during operation such that the housing 150 co-rotates with the drive feature 138 in the direction of a torque input when the removable connection 154 is engaged and there is a torque input present. The drive feature 138 is rotatably supported on the center shaft 134-1 of the journal bracket 134 by suitable bearings 156 in the illustrated embodiment. The bearings 156 can be retained on the center shaft 134-1 by a retaining ring 158, which can be threaded onto the center shaft 134-1 or alternatively press-fit, swaged, or secured by other suitable means. When the removable connection 154 is engaged the retaining ring 158 is located radially inside the stub shaft 150-2. In the illustrated embodiment, the drive feature 138 is threadably engaged with the stub shaft 150-2 of the housing 150 toward a front side of the drive feature 138 (that is, opposite the mounting flange 134-2 of the journal bracket 134) to form the removable connection 154, with threads 154B having a reverse thread in relation to a direction of rotation of a torque input. More particularly, in the illustrated embodiment, the drive feature 138, configured as a pulley or sheave, has a generally I-shaped sectional profile and includes a radially outer engagement portion 138-1 that engages a belt (not shown in FIGS. 2 and 3), a radially-extending portion 138-2, and a radially inner base portion 138-3. The radially extending portion 138-2 extends between and connects the outer engagement portion 138-1 and the base portion 138-3, with the outer engagement portion 138-1 radially spaced from the base portion 138-3. While the drive feature 138 is shown in the illustrated embodiment as a single monolithic component, in alternative embodiments the drive feature 138 could be an assembly of separate components connected together. The radially inner base portion 138-3 can have an annular shape with a central opening, which allows the center shaft 134-1 of the journal bracket 134 and the bearings 156 to be inserted into the central opening of the drive member 138. In further embodiments, the radially outer engagement portion 138-1 could instead provide sprocket teeth or gear teeth, and could be integrated into the radially-extending portion 138-2. An inner surface of the base portion 138-3 engages the bearings 156, with a bearing stop 138-3B extending radially inward from the base portion 138-3 to help retain the bearings 156, and external threads 154B for the removable connection 154 are located at an outer surface of the base portion 138-3 to the front of the radially-extending portion 138-2, such that the threads 154 are located inward from the radially outer engagement portion 138-1. The removable connection 154 can be axially aligned with the bearings 156 or can axially overlap with the bearings 156, and can be located radially outward of the bearings 156. The shoulder 150-7 on the stub shaft 150-2 can act as a stop to retain the bearings 156 when the removable connection 154 is engaged. In that way, tightening the removable connection 154 applies a compressive load on a race of the bearings 156 between the bearing stop 138-3B and the shoulder 150-7, which can help to retain the drive feature 138 in the axial direction during operation. A small axial gap can be provided between the shoulder 150-7 (or other adjacent portion of the housing 150) and a front end of the base portion 138-3 when the removable connection 154 is fully engaged, which can facilitate application of the compressive load on the bearings 156. The housing 150 can be separated from the drive feature 138 in the axial direction after loosening the threaded engagement between them, thereby disconnecting the removable connection 154. Though the removable connection 154 is independent from the fasteners or other mechanism used to attach the housing 150 to the clutch pack 136, such that the housing 150 and the clutch pack 136 can remain attached together as the common unit U when the removable connection 154 is disengaged. The drive feature 138 can be made of steel, cast iron, or another suitable metal. In some embodiments, the drive feature 138 is made of a different material than the housing 150, for instance, the drive feature 138 made of steel or cast iron but the housing 150 instead made of aluminum.

The rotary fluid union includes a face seal 160-1 and a floating seal 160-2 that allow the transmission of a pressurized fluid signal (e.g., a pneumatic signal) between the passageway 134-3 of the journal backet 134, which is rotationally stationary, and the passageway 150-5 of the housing 150, which is rotatable. The face seal 160-1 and the floating seal 160-2 each have central passageways that are brought together to complete a fluid path that fluidically connects the passageway 134-3 of the journal backet 134 and the passageway 150-5 of the housing 150 across a rotational interface. In that way, the rotary fluid union generally provides a fluid-tight interface while still allowing rotation between the face seal 160-1 and the floating seal 160-2. The face seal 160-1 is often made from hardened steel making it resistant to wear, and can be engaged at a mounting location at or in the passageway 134-3 of the journal bracket 134 with threads, for example. The floating seal 160-2 is a wearable component and can have a body made of a polymer material that contacts the face seal 160-1, with the floating seal 160-2 pressed in place at a mounting location with suitable ring seal(s) and biased toward the face seal 160-1 by a spring. In the illustrated embodiment, the floating seal 160-2 is present into the central boss 150-3. In prior art clutch designs, the face seal was provided as part of the clutch pack unit while the floating seal (that is, the wearable device) was provided with the journal bracket.

Although the face seal and the floating seal can both be replaced as part of maintenance, in many cases, when performing maintenance on a clutch assembly that has been in use, the floating seal requires replacement but the face seal does not need to be replaced due to a lack of wear. In the presently disclosed clutch assembly 132, the consumable, wearable floating seal 160-2 is positioned on or in the common unit U that includes the rotatable clutch pack 136 and the housing 150. When conducting a repair, this simplifies the process as only the common unit U (carrying the floating seal 160-2) has to be removed and later replaced or reinstalled. This is especially important by permitting repair with the journal bracket 134 remaining installed (for instance, remaining attached to a mounting location in the vehicle) and with the face seal 160-1 remaining installed on the journal bracket 134. In the event that the face seal 160-1 also needs replacement, the face seal 160-1 can have a simple hex or other wrench interface that is accessible while the journal bracket 134 (and drive feature 138) remains installed on the vehicle following removal of the common unit U that includes the clutch pack 136. Even though the face seal 160-1 can be arranged parallel to the axis of rotation A' as well as the axis of rotation A (when the clutch pack 136 is fully installed), the removal of the clutch pack 136 and housing 150 (as well as the fan) makes access to the face seal 160-1 easier than access to parallel-oriented journal bracket fasteners for which access and visibility is limited by the presence of the clutch pack 136, fan, belt, and/or other components.

A method for performing maintenance on the clutch assembly 32 or 132 that has been used in service (such as within the vehicle engine compartment 20) can include the following steps. First, disconnect the common unit U, including the housing 150 and the clutch pack 36 or 136, from the drive feature 38 or 138 (e.g., pulley), thereby disengaging the removable connection 154. This disconnection step can involve only perpendicular access to the perpendicular access feature(s) 150-4 from the location L, such as engaging a pin spanner wrench, adjustable or fixed wrench, or other suitable tool with the perpendicular access feature(s) 150-4 on the stub shaft 150-2 to rotate the common unit U to loosen and disengage the threads 154A and 154B of the removable connection 154, for example. In embodiments in which the removable connection 154 includes a reverse threaded connection (in relation to a direction of a torque input to the clutch assembly 32 or 132), the common unit U is rotated opposite the direction of the torque input to the clutch assembly 32 or 132 from the engine 26 (and the belt 40 or the like). Direct line-of-sight access to the perpendicular access feature(s) 150-4 is present at the location L, and can involve line-of-sight access for tooling used by a mechanic standing or otherwise positioned outside of the engine compartment enclosure 24. In other words, the location L can extend outside of the engine compartment 20 and the engine compartment enclosure 24 (see FIG. 1). The fan 30 and the housing 150 can remain attached to the clutch pack 36 or 136 as part of this step, and the piston chamber 152 remains enclosed within the common unit U as part of this step. Moreover, the drive feature 38 or 138 can remain supported on the journal bracket 34 or 134 as part of this step, and a belt 40, chain, or other torque delivery device can remain engaged with the drive feature 38 or 138 and also a fluid supply line (e.g., pneumatic supply line hose) can remain attached to the passageway 134-3 of the journal bracket 134.

Optional replacement of the rotary fluid union's face seal 160-1 on the journal bracket 34 or 134 can be performed after the removable connection 154 is disengaged and the common unit U is removed. This step can be omitted if there is little or no wear to the face seal 160-1. Additionally, the floating seal 160-2 can be replaced with a new floating seal 160-2 on the housing 150 after the removable connection 154 is disengaged and the common unit U is removed. It is easier to replace the floating seal 160-2 when the housing 150 (and the entire common unit U) is outside the engine compartment 20 than to attempt to replace the floating seal 160-2 on a component (the housing 150) still inside the engine compartment 20, where space and visibility are more limited.

Next, re-connect the common unit U, including the clutch pack 36 or 136 and the housing 150, to the drive feature 38 or 138, thereby re-engaging the removable connection 154. In some embodiments, the re-connected clutch pack 36 or 136 and/or housing 150 can be new (i.e., previously unused) or remanufactured components. If new (or remanufactured) a housing 150 is to be installed, the floating seal 160-2 is replaced with a new floating seal 160-2 on the housing 150. In other embodiments, the original clutch pack 36 or 136 and/or housing 150 can be re-used, though the floating seal 160-2 can still be replaced with a new floating seal 160-2 on the housing 150 even when the housing 150 is re-used.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For example, while reference has been made herein to certain configurations of dry friction clutch packs, other configurations of friction clutch packs can be utilized in further embodiments, as well as viscous clutch packs and clutch packs that are engageable through other means or mechanisms.

The invention claimed is:

1. A clutch assembly comprising:
   a journal bracket having a center shaft;
   a drive feature rotatably supported on the center shaft of the journal bracket, wherein the drive feature is configured to accept a torque input to the clutch assembly;
   a clutch pack, wherein the clutch pack is controllable to selectively transmit torque between an input and an output;
   a housing attached to the clutch pack, wherein the housing includes a stub shaft;
   a removable connection engaged between the drive feature and the stub shaft such that torque is transmittable through the removable connection during operation of the clutch assembly; and
   one or more perpendicular engagement features on the stub shaft configured to accept a tool to engage and disengage the removable connection, wherein at least one of the perpendicular engagement features is exposed to line-of-sight access from a location substantially perpendicular to an axis of rotation of the clutch pack.

2. The clutch assembly of claim 1, wherein the drive feature is selected from the group consisting of a pulley, a sprocket, and a gear.

3. The clutch assembly of claim 1, wherein the removable connection is a threaded connection.

4. The clutch assembly of claim 3, wherein the threaded connection is reverse threaded in relation to a direction of a torque input to the clutch assembly.

5. The clutch assembly of claim 1, wherein the clutch pack is a fluidically-actuated dry friction clutch pack.

6. The clutch assembly of claim 5 and further comprising:
   a face seal carried by the journal bracket; and
   a floating seal carried by the housing, wherein the floating seal contacts the face seal to form a rotary fluid union when the removable connection is engaged, and wherein the floating seal remains carried by the housing and the face seal remains carried by the journal bracket when the removable connection is disengaged.

7. The clutch assembly of claim 1, wherein the drive feature comprises a pulley having an outer engagement portion to engage a belt, a radially inner base portion, a radially extending portion connecting the outer engagement portion and the base portion, and external threads on the base portion, wherein the external threads threadably engage internal threads on the stub shaft to form the removable connection.

8. The clutch assembly of claim 1 and further comprising:
   bearings having a race, wherein the pulley is rotatably mounted on the center shaft of the journal bracket by the bearings;
   a bearing stop extending from the drive feature; and
   a shoulder on the stub shaft, wherein threaded engagement of the removable connection applies a compressive load on the race of the bearings, with the compressive load applied between the bearing stop and the shoulder.

9. The clutch assembly of claim 8 and further comprising:
   a retaining ring engaged to the center shaft of the journal bracket to retain the bearings on the center shaft, wherein the retaining ring is positioned radially inside the stub shaft when the removable connection is engaged.

10. The clutch assembly of claim 1, wherein the housing is rotationally fixed to an input of the clutch pack, and wherein the attachment of the housing to the clutch pack is independent of the removable connection such that the housing and the clutch pack remain attached together as a common unit that is separable from the journal bracket and the drive feature when the removable connection is disengaged.

11. The clutch assembly of claim 1, wherein the one or more perpendicular engagement features comprise at least one slot engageable with a pin spanner wrench.

12. An assembly comprising:
    an engine compartment enclosure at least partially surrounding an engine compartment;

an engine positioned at least partially within the engine compartment enclosure;

a clutch assembly mounted on or near the engine that accepts torque input from the engine, the clutch assembly comprising:
 a journal bracket having a center shaft;
 a drive feature rotatably supported on the center shaft of the journal bracket, wherein the drive feature is selected from the group consisting of a pulley, a sprocket, and a gear;
 a clutch pack, wherein the clutch pack is controllable to selectively transmit at least a portion of the torque input received by the clutch assembly during operation between an input and an output;
 a stub shaft attached to the clutch pack;
 a removable connection engaged between the drive feature and the stub shaft such that torque is transmittable through the removable connection during operation of the clutch assembly;
 a face seal carried by the journal bracket;
 a floating seal carried within the stub shaft; and
 a perpendicular engagement feature on the stub shaft configured to accept a tool to engage and disengage the removable connection, wherein the perpendicular engagement feature is selected from the group consisting of a slot for a pin spanner wrench and a wrench flat, and wherein the perpendicular engagement feature is exposed to line-of-sight access from a location substantially perpendicular to an axis of rotation of the clutch pack; and
 a fan carried by the clutch pack.

13. The assembly of claim 12 and further comprising:
bearings having a race, wherein the pulley is rotatably mounted on the center shaft of the journal bracket by the bearings;
a bearing stop extending from the pulley;
a shoulder on the stub shaft, wherein threaded engagement of the removable connection applies a compressive load on the race of the bearings, with the compressive load between the bearing stop and the shoulder; and
a retaining ring engaged to the center shaft of the journal bracket to retain the bearings on the center shaft, wherein the retaining ring is positioned radially inside the stub shaft when the removable connection is engaged.

14. A method for performing maintenance or repair on a fan clutch assembly that selectively transmits torque to a fan and is mounted within an engine compartment, the method comprising:
 engaging a tool with one or more perpendicular access features on the fan clutch assembly from a location (L) with substantially perpendicular line-of-sight access from outside the engine compartment, wherein the location (L) extends through an axial gap that adjoins a stub shaft between the drive feature and the clutch pack;
 disconnecting a common unit that includes the stub shaft and a clutch pack from a drive feature that accepts a torque input to the fan clutch assembly to disengage a removable connection using the tool, wherein a journal bracket of the fan clutch assembly remains secured to a mounting location within the engine compartment when the common unit is disconnected from the drive feature, and wherein the drive feature is selected from the group consisting of a pulley, a sprocket, and a gear;
 performing a repair or replacement operation on at least one component of the fan clutch assembly while the common unit is disconnected from the drive feature and the removable connection is disengaged; and
 re-connecting the common unit to the drive feature to re-engage the removable connection after performing the repair or replacement operation.

15. The method of claim 14, wherein the repair or replacement operation comprises replacing a floating seal on the common unit while the common unit is disconnected from the drive feature and the removable connection is disengaged.

16. The method of claim 14, wherein the removable connection comprises a threaded connection, and wherein the step of disconnecting the common unit that includes the stub shaft and the clutch pack from the drive feature that accepts a torque input to the fan clutch assembly to disengage the removable connection using the tool involves rotating the common unit using the tool.

17. The method of claim 16, wherein the common unit is rotated using the tool in a reverse direction that is opposite a direction of a torque input to the fan clutch assembly.

18. The method of claim 14, wherein the step of re-connecting the common unit to the drive feature to re-engage the removable connection after performing the repair or replacement operation further involves applying a compressive load to a bearing that rotatably supports the drive feature on the journal bracket, wherein the compressive load is applied between portions of the drive feature and the stub shaft.

19. The method of claim 14, wherein the drive feature remains secured to the journal bracket when the common unit is disconnected from the drive feature.

20. The method of claim 14, wherein the clutch pack is pneumatically actuatable and a pneumatic supply line hose remains engaged with the journal bracket when the common unit is disconnected from the drive feature, and wherein the drive feature comprises a pulley and a belt remains engaged with the pulley when the common unit is disconnected from the pulley.

* * * * *